(12) United States Patent
Lee

(10) Patent No.: US 9,299,193 B2
(45) Date of Patent: *Mar. 29, 2016

(54) HEAD-UP DISPLAY APPARATUS FOR VEHICLE USING AUGMENTED REALITY

(71) Applicant: Hyundai Motor Company, Seoul (KR)

(72) Inventor: Jong Bok Lee, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 142 days.

This patent is subject to a terminal disclaimer.

(21) Appl. No.: 14/144,287

(22) Filed: Dec. 30, 2013

(65) Prior Publication Data

US 2015/0084988 A1 Mar. 26, 2015

(30) Foreign Application Priority Data

Sep. 26, 2013 (KR) .................. 10-2013-0114697

(51) Int. Cl.
*G06T 19/00* (2011.01)
*B60W 40/072* (2012.01)
*G02B 27/01* (2006.01)
*G06T 11/00* (2006.01)

(52) U.S. Cl.
CPC ............ *G06T 19/006* (2013.01); *B60W 40/072* (2013.01); *G02B 27/01* (2013.01); *G02B 27/017* (2013.01); *G06T 11/00* (2013.01); *B60R 2300/205* (2013.01); *B60R 2300/302* (2013.01); *G02B 2027/014* (2013.01)

(58) Field of Classification Search
None
See application file for complete search history.

(56) References Cited

U.S. PATENT DOCUMENTS

| 8,577,552 | B1* | 11/2013 | Smit ................................ 701/41 |
| 2002/0032515 | A1* | 3/2002 | Nakamura et al. .............. 701/96 |
| 2010/0253539 | A1* | 10/2010 | Seder et al. ................... 340/903 |
| 2010/0253595 | A1* | 10/2010 | Szczerba et al. .................. 345/7 |
| 2012/0179350 | A1* | 7/2012 | Taneyhill et al. ............... 701/96 |
| 2013/0080019 | A1* | 3/2013 | Isaji et al. ....................... 701/96 |

FOREIGN PATENT DOCUMENTS

| JP | 2005-067369 A | 3/2005 |
| KR | 10-2012-0058022 A | 6/2012 |
| KR | 10-2012-0066472 A | 6/2012 |
| KR | 10-2013-0012629 A | 2/2013 |

OTHER PUBLICATIONS

"Versine", Wikipedia, URL http://en.wikipedia.org/wiki/Versine, Dec. 16, 2011.*

* cited by examiner

*Primary Examiner* — Phi Hoang
*Assistant Examiner* — Diane Wills
(74) *Attorney, Agent, or Firm* — McDermott Will & Emery LLP

(57) ABSTRACT

A head-up display device for a vehicle using augmented reality includes a distance detector configured to detect a distance between a driver's vehicle and a front vehicle in front of the driver's vehicle to output distance information. A navigator is configured to output a position of the driver's vehicle and information about a road on which the driver's vehicle drives, as driving information. An image controller is configured to calculate a transverse position of the front vehicle according to the distance information and the driving information, and generate image information corresponding to the front vehicle by using the transverse position. The image controller corrects the transverse position according to whether any one of the driver's vehicle and the front vehicle enters a junction between a curved road and a straight road.

10 Claims, 4 Drawing Sheets

HEAD-UP DISPLAY APPARATUS FOR VEHICLE USING AUGMENTED REALITY

CROSS-REFERENCE TO RELATED APPLICATION

This application claims the benefit of priority to Korean Patent Application No. 10-2013-0114697 filed in the Korean Intellectual Property Office on Sep. 26, 2013, the entire contents of which are incorporated herein by reference.

TECHNICAL FIELD

The present disclosure relates to a technology for a head-up display device for a vehicle using augmented reality, and more particularly, to a technology for a head-up display device for a vehicle using augmented reality, which is capable of correcting a transverse error between an actual position and virtual position of a front vehicle when a graphic image of the front vehicle driving a curved road is generated through the augmented reality.

BACKGROUND

Augmented reality is one of virtual realities of displaying one image by combining a real world view, as viewed by a user's eyes and a virtual world having additional information. That is, in the augmented reality, a realistic image, which a user views, overlaps a 3D virtual image through a computer graphic, so that a discrimination between a reality environment and the virtual image is ambiguous. In the augmented reality, a realistic environment is combined with a virtual environment, so that the user may view the realistic environment, thereby providing an improved sense of reality.

Recently, a head-up display (HUD) projecting a current speed of a vehicle, residual fuel quantity, road guide information of a navigation device, and the like on a windshield glass part at a front side of a driver by a graphic image by using augmented reality has been developed. In particularly, a function of displaying a position and a distance of an object, for example, natural scenery, a road or a construction structure, a vehicle, and a pedestrian, in an actual space at a front side of the windshield glass through the HUD has been developed.

A distance between an object and a vehicle in the actual space may be recognized by transmitting radio waves or ultrasonic waves through a radar or a lidar and measuring a period of time in which the radio waves or the ultrasonic waves are reflected and returned from the vehicle.

In general, in a case where a front vehicle drives a curved road, the front vehicle is viewed as if the vehicle drives the curved road by moving in parallel at a predetermined distance in a transverse direction compared to a corresponding vehicle. However, the radar has a distance error of about 1 m in the transverse direction, so that when the augmented reality generates a position of the front vehicle by a graphic image, a large error between the actual position of the front vehicle and the graphic image is generated.

The above information disclosed in this Background section is only for enhancement of understanding of the background of the disclosure, and therefore, it may contain information that does not form the prior art that is already known in this country to a person of ordinary skill in the art.

SUMMARY

The present disclosure provides a head-up display device using augmented reality, which is capable of correcting a transverse error between an actual position of a front vehicle in front of the driver and a position in a graphic image when the graphic image of the front vehicle driving a curved road is generated through the augmented reality.

According to an exemplary embodiment of the present disclosure, a head-up display device for a vehicle using augmented reality includes a distance detector configured to detect a distance between a driver's vehicle and a front vehicle in front of the driver's vehicle to output distance information. A navigator is configured to output a position of the driver's vehicle and information about a road on which the driver's vehicle drives as a driving information. An image controller is configured to calculate a transverse position of the front vehicle according to the distance information and the driving information, and generate image information corresponding to the front vehicle by using the transverse position. The image controller corrects the transverse position according to whether any one of the driver's vehicle and the front vehicle enters a junction between a curved road and a straight road.

The driving information includes the number of lanes of the road on which the driver's vehicle drives, a width of the road, a curvature radius of the curved road, a driving direction of the driver's vehicle, and a distance from the driver's vehicle to the junction.

Before the driver's vehicle and the front vehicle enter the junction, the image controller may calculate the transverse position by using the distance between the driver's vehicle and the front vehicle, and a center value of a width of a lane in which the driver currently drives.

The image controller may calculate the transverse position of the front vehicle according to Equation 1 below when the distance from the driver's vehicle to the junction is larger than the distance from the driver's vehicle to the front vehicle.

$$x = R'\left(1 - \cos\left(\frac{360 \times d}{2\pi \times R}\right)\right) \quad \text{[Equation 1]}$$

Where, d is the distance from the driver's vehicle to the front vehicle, R is the curvature radius of the curved road, R' is a sum of the curvature radius of the curved road, a width of entire lanes positioned in a direction opposite to the driving direction of the driver's vehicle based on a centerline of the road, and the center value of the width of the entire lanes positioned in the driving direction of the driver's vehicle.

Before the driver's vehicle enters the junction, and after the front vehicle enters the junction, the image controller may correct the transverse position by using a distance between the junction and the front vehicle, and a center value of a width of a lane on which the driver's vehicle currently drives.

The image controller may calculate the transverse position of the front vehicle according to Equation 2 below when a distance from the driver's vehicle to the front junction is smaller than the distance from the driver's vehicle to the front vehicle.

$$x = R'\left(1 - \cos\left(\frac{360 \times dp}{2\pi \times R}\right)\right) \quad \text{[Equation 2]}$$

Where, dp is a value obtained by subtracting the distance from the driver's vehicle to the junction from the distance from the driver's vehicle to the front vehicle, R is the curvature radius of the curved road, and R' is a sum of the curvature radius of the curved road, a width of entire lanes positioned in a direction opposite to a driving direction of the driver's vehicle based on a centerline of the road, and a center value of the width of the entire lanes positioned in the driving direction of the driver's vehicle.

The distance detector may include any one of a camera capturing an image of the road, a radar, and a lidar.

The head-up display device may further include an image radiator configured to generate a virtual image according to the image information, and radiate the generated virtual image on a windshield of the driver's vehicle.

According to the exemplary embodiments of the present disclosure, when a graphic image of a front vehicle driving a curved road is generated through augmented reality, a transverse position of the front vehicle is corrected by using a curvature radius of a lane which a driver's vehicle currently drives, and a center value of a width of entire lanes, thus decreasing an error between an actual position of the front vehicle and a position on the graphic image.

DETAILED DESCRIPTION

Figure 1:
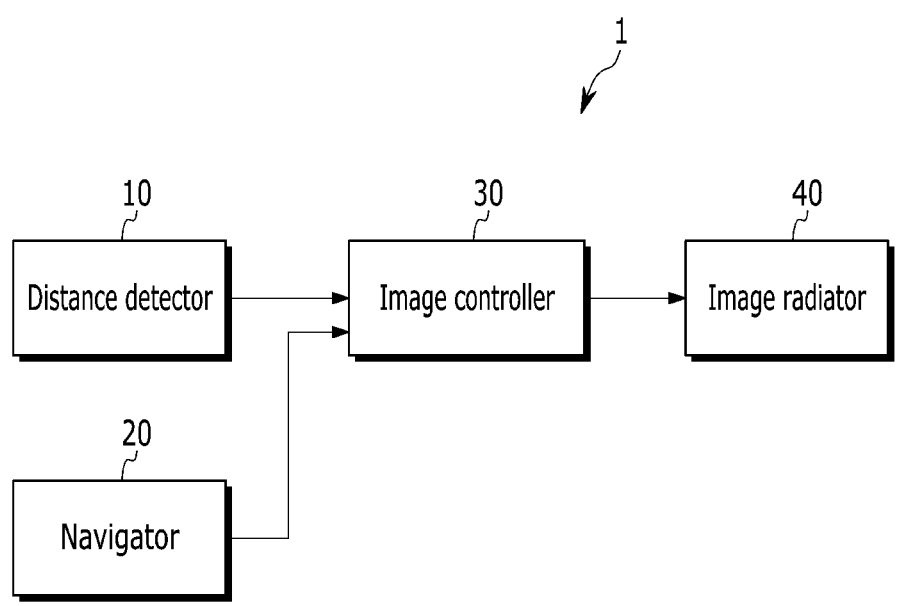
FIG. 1 is a diagram illustrating a head-up display device for a vehicle using augmented reality according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout this specification and the claims that follow, unless explicitly described to the contrary, the word "comprise" and variations such as "comprises" or "comprising", will be understood to imply the inclusion of stated elements but not the exclusion of any other elements.

Hereinafter, an exemplary embodiment, which those skilled in the art easily implement, will be described in detail with reference to the accompanying drawings.

FIG. 1 is a diagram illustrating a head-up display device for a vehicle using augmented reality according to an exemplary embodiment of the present disclosure. Referring to FIG. 1, a head-up display device 1 for a vehicle includes a distance detector 10, a navigator 20, an image controller 30, and an image radiator 40. The distance detector 10 detects a distance between a driver's vehicle and a front object and outputs distance information. Here, the distance detector 10 may include any one of a camera capturing a road image and a radar or a lidar radiating radio waves or ultrasonic waves. The object includes a front vehicle in front of the driver's vehicle, a person, scenery, and the like, and hereinafter, the present disclosure will be described based on an example in which the object is a front vehicle.

The navigator 20 maps a current position of the driver's vehicle on a pre-stored map by using a global positioning system (GPS), and generates driving information according to a mapping result. Here, the driving information includes the number of lanes of a road, on which the driver's vehicle drives, a width of the road, a curvature radius of the road, a driving direction, a current position of the driver's vehicle, and a distance from the current position of the driver's vehicle to a front junction. Here, the junction corresponds to a changed point between a curved road and a straight road.

The image controller 30 receives the distance information from the distance detector 10, and receives the driving information from the navigator 20. The image controller 30 determines whether the driver's vehicle and the front vehicle enter the front junction according to the distance information and the driving information, and calculates a transverse position of the front vehicle according to a result of the determination on whether the driver's vehicle and the front vehicle enter the front junction.

The image controller 30 calculates a position of the front vehicle by using the transverse position and the distance between the driver's vehicle and the front vehicle, and matches the calculated position of the front vehicle and driver's eyes through augmented reality to generate image information. Here, the image controller 30 may insert additional information, such as a speed, fuel, a driving distance, and a road guide indication, into the image information.

Particularly, the image controller 30 calculates the transverse position x of the front vehicle according to Equation 1 below in a case before the driver's vehicle and the front vehicle enter the front junction.

$$x = R'\left(1 - \cos\left(\frac{360 \times d}{2\pi \times R}\right)\right) \qquad \text{[Equation 1]}$$

Here, d is a distance from the driver's vehicle and the front vehicle, and R is a curvature radius of the curved road. R' is a constant calculated according to the curvature radius of the curved road and lane information. The lane information includes a width of entire lanes corresponding to a direction in which the driver's vehicle drives based on a centerline of the road, and the width of the entire lanes corresponding to a direction opposite to the driving direction of the vehicle. Here, the shoulder, which is not an actual driving lane, is excluded from the lanes.

For example, in a case where a road has four forward lanes and four lanes in the opposite direction, and the driver's vehicle drives a lane in a right direction based on the centerline will be described as an example. Here, a width of each lane may be approximately 3.5 m. In this case, R' corresponds to "a curvature radius of the curved road+a width of entire lanes of the four-lane road positioned in a left direction of the centerline+a center value of a width of entire lanes of the four-lane road positioned in a right direction of the centerline". That is, R' is a value of "the curvature radius of the curved road+(4*3.5)+(4*3.5/2)". When the road has two forward and two opposite direction lanes, a center value of a width of a lane of the one-lane road positioned in the right direction of the centerline may be calculated to be "'3.5/2".

That is, when all of the driver's vehicle and the front vehicle enter the curved road, the image controller 30 calculates the transverse position x of the front vehicle according to the curvature radius of the road based on the center value of the width of the entire lanes corresponding to the direction in which the driver's vehicle of the driver drives, and the distance between the driver's vehicle and the front vehicle.

In the meantime, only the front vehicle enters the front junction, the image controller 20 calculates the transverse position x of the front vehicle according to Equation 2 below.

$$x = R'\left(1 - \cos\left(\frac{360 \times dp}{2\pi \times R}\right)\right) \qquad \text{[Equation 2]}$$

Where, dp is obtained by subtracting a distance dj between the driver's vehicle and the front junction from the distance d between the driver's vehicle and the front vehicle. That is, when the driver's vehicle drives the straight road, and only the front vehicle enters the curved road, the image controller 30 changes the distance d between the vehicle of the driver and the front vehicle to the distance dp between the front vehicle and the front junction.

That is, the image controller 30 recognizes the position of the front vehicle based on the front junction and corrects the transverse position x of the front vehicle by reflecting a state in which the driver's eyes of the driver's vehicle are inclined by a predetermined angle in a direction of the front vehicle entering the curved road.

The image radiator 40 generates a virtual image according to the image information and radiates the generated image on the windshield of the vehicle. The driver may identify the virtual image through a holographic mirror on the windshield.

Figure 2:
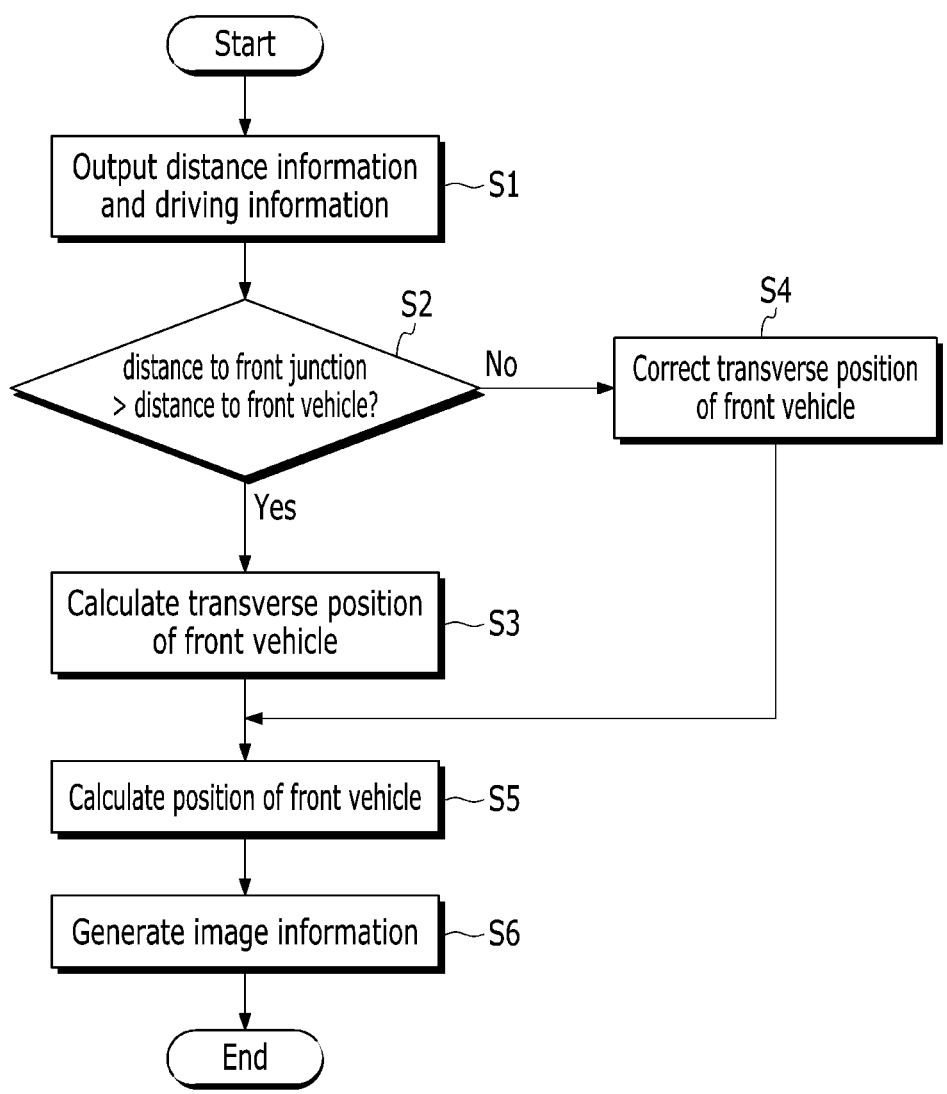
FIG. 2 is a flowchart illustrating a head-up display method for a vehicle using augmented reality according to an exemplary embodiment of the present disclosure.
Figure 3A:
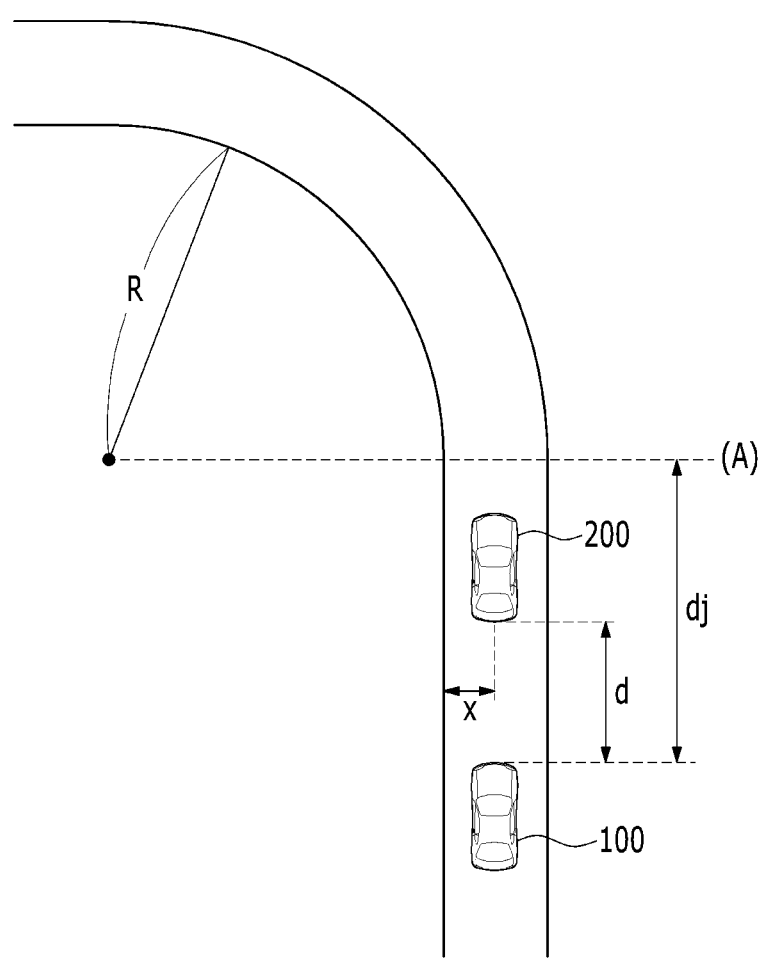
FIGS. 3A and 3B are drawings illustrating a road driving situation of a driver's vehicle and a front vehicle in front of the driver's vehicle as an example.
Figure 3B:
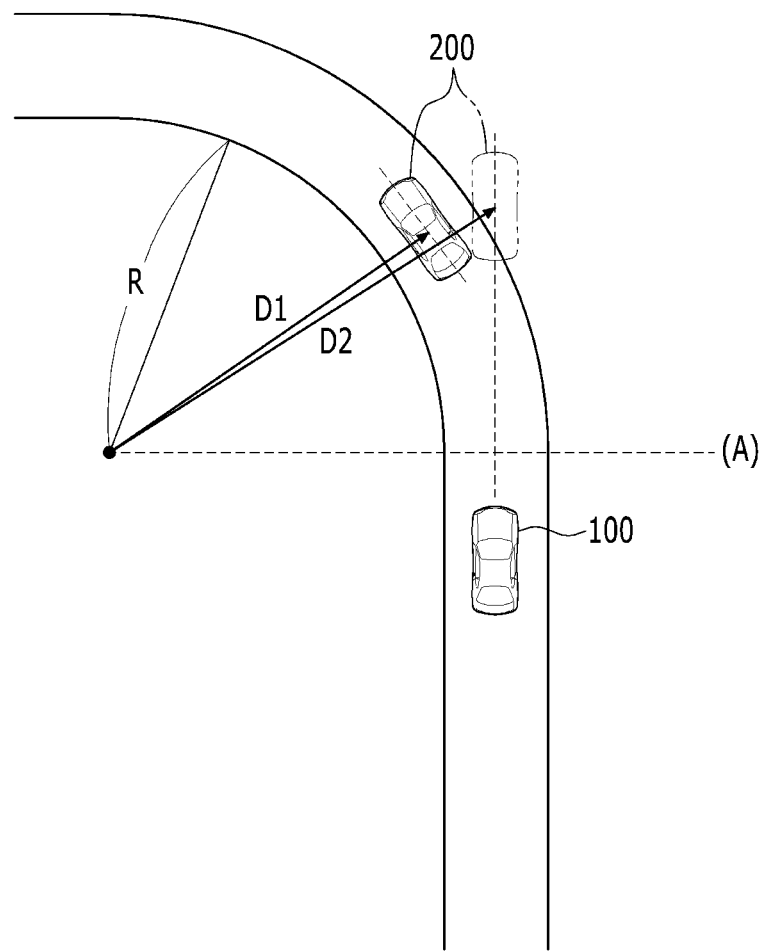

FIG. 2 is a flowchart illustrating a head-up display method for a vehicle using augmented reality according to an exemplary embodiment of the present disclosure, and FIGS. 3A and 3B are drawings illustrating a road driving situation of a driver's vehicle and a front vehicle as an example.

Referring to FIG. 2, the distance detector 10 first detects a distance d between a driver's vehicle 100 and a front vehicle 200 in front of the driver's vehicle 100 driving in the same direction as that of the driver's vehicle 100, and outputs distance information. The navigator 20 generates driving information. In this case, as illustrated in FIG. 3A, the navigator 20 outputs a curvature radius R of a curved road, a distance dj from a current position of the driver's vehicle 100 to a front junction A, and road information about a road on which the driver's vehicle 100 currently drives as driving information (step S1).

Then, the image controller 30 determines whether the distance dj from the current position of the driver's vehicle 100 to the front junction A is larger than the distance d from the driver's vehicle 100 to the front vehicle 200 (step S2). As a result of the determination, when the distance dj from the current position of the driver's vehicle 100 to the front junction A is larger than the distance d from the driver's vehicle 100 to the front vehicle 200, the image controller 30 calculates a transverse position x of the front vehicle 200 according to Equation 1 (step S3).

However, when the distance dj from the current position of the driver's vehicle 100 to the front junction A is smaller than the distance d from the driver's vehicle 100 to the front vehicle 200, the image controller 30 corrects the transverse position x of the front vehicle 200 according to Equation 2 (step S4).

Next, the image controller 30 calculates a position of the front vehicle by using the calculated transverse position x of the front vehicle 200 (step S5), and matches the calculated position of the front vehicle with the driver's eyes through the augmented reality to generate image information (step S6).

That is, in an exemplary embodiment of the present disclosure, as illustrated in FIG. 3B, when only the front vehicle 200 enters the curved road, the transverse position x of the front vehicle 200 is corrected according to the curvature radius of the curved road and the center value of the width of the entire lanes corresponding to the driving direction of the driver's vehicle 100, thereby decreasing an error between an actual position D1 of the front vehicle 200 and an output position D2 of the virtual image.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A head-up display device for a vehicle using augmented reality, comprising:
    a distance detector configured to detect a distance between a driver's vehicle and a front vehicle in front of the driver's vehicle to output distance information;
    a navigator configured to output a position of the driver's vehicle and information about a road on which the driver's vehicle drives, as driving information; and
    an image controller configured to calculate a transverse position of the front vehicle according to the distance information and the driving information, and generate image information corresponding to the front vehicle by using the transverse position,
    wherein the image controller corrects the transverse position according to whether any one of the driver's vehicle and the front vehicle enters a junction between a curved road and a straight road.

2. The head-up display device of claim 1, wherein the driving information includes the number of lanes of the road on which the driver's vehicle drives, a width of the road, a curvature radius of the road, a driving direction of the driver's vehicle, and a distance from the driver's vehicle to the junction.

3. The head-up display device of claim 2, wherein before the driver's vehicle and the front vehicle enter the junction, the image controller calculates the transverse position by using the distance between the driver's vehicle and the front vehicle, and a center value of a width of a lane on which the driver's vehicle currently drives.

4. The head-up display device of claim 3, wherein the image controller calculates the transverse position of the front vehicle according to Equation 1 below when the distance from the driver's vehicle to the junction is larger than a distance from the driver's vehicle to the front vehicle, $$x = R'\left(1 - \cos\left(\frac{360 \times d}{2\pi \times R}\right)\right) \qquad \text{[Equation 1]}$$

where, d is the distance from the driver's vehicle to the front vehicle, R is the curvature radius of the curved road, R' is a sum of the curvature radius of the curved road, a width of entire lanes positioned in a direction opposite to the driving direction of the driver's vehicle based on a centerline of the road, and a center value of the width of the entire lanes positioned in the driving direction of the driver's vehicle.

5. The head-up display device of claim 2, wherein before the driver's vehicle enters the junction, and after the front vehicle enters the junction, the image controller corrects the transverse position by using a distance between the junction and the front vehicle, and a center value of a width of a lane on which the driver's vehicle currently drives.

6. The head-up display device of claim 2, wherein the image controller calculates the transverse position of the front vehicle according to Equation 2 below when the distance from the driver's vehicle to the junction is smaller than the distance from the driver's vehicle to the front vehicle, $$x = R'\left(1 - \cos\left(\frac{360 \times dp}{2\pi \times R}\right)\right) \quad \text{[Equation 2]}$$

where, dp is obtained by subtracting the distance from the driver's vehicle to the junction from the distance from the driver's vehicle to the front vehicle, R is the curvature radius of the curved road, and R' is a sum of the curvature radius of the curved road, a width of entire lanes positioned in a direction opposite to the driving direction of the driver's vehicle based on a centerline of the road, and a center value of the width of the entire lanes positioned in the driving direction of the driver's vehicle.

7. The head-up display device of claim 1, wherein the distance detector includes any one of a camera capturing an image of the road.

8. The head-up display device of claim 1, further comprising an image radiator configured to generate a virtual image according to the image information, and radiate the generated virtual image on a windshield of the driver's vehicle.

9. The head-up display device of claim 1, wherein the distance detector includes a radar.

10. The head-up display device of claim 1, wherein the distance detector includes a lidar.

* * * * *